United States Patent [19]

Blaser

[11] Patent Number: 5,249,895
[45] Date of Patent: Oct. 5, 1993

[54] TOOL HOLDING FIXTURE

[75] Inventor: Kurt Blaser, Zuchwil, Switzerland

[73] Assignee: Planetron AG, Switzerland

[21] Appl. No.: 849,013

[22] PCT Filed: Apr. 17, 1991

[86] PCT No.: PCT/CH91/00090
§ 371 Date: Apr. 21, 1992
§ 102(e) Date: Apr. 21, 1992

[87] PCT Pub. No.: WO92/03242
PCT Pub. Date: Mar. 5, 1992

[30] Foreign Application Priority Data

Aug. 21, 1990 [CH] Switzerland ............ 2706/90.2

[51] Int. Cl.$^5$ ........................... B23B 51/00
[52] U.S. Cl. ..................... 408/156; 408/153; 408/181
[58] Field of Search ............ 279/132, 133; 408/154, 408/156, 178, 180, 181, 714, 238, 153

[56] References Cited

U.S. PATENT DOCUMENTS

| 2,368,846 | 2/1945 | Klomp | 408/156 |
|---|---|---|---|
| 3,041,898 | 7/1962 | Better | 408/154 |
| 3,261,236 | 7/1966 | Flannery | . |
| 3,379,077 | 4/1968 | Gustafson | . |
| 4,776,734 | 10/1988 | Buettiker et al. | 408/181 |
| 4,930,957 | 6/1990 | Priessnitz | 408/156 |

FOREIGN PATENT DOCUMENTS

| 418041 | 3/1991 | European Pat. Off. | 408/156 |
|---|---|---|---|
| 2586951 | 3/1987 | France | . |
| 8001364 | 7/1980 | PCT Int'l Appl. | . |
| 986622 | 1/1983 | U.S.S.R. | 408/181 |

Primary Examiner—Daniel W. Howell
Attorney, Agent, or Firm—Speckman, Pauley & Fejer

[57] ABSTRACT

A tool holding fixture having a rotationally symmetrical holding body and a shaft that form one piece. The one piece has an axially directed first annular groove which is concentric with the shaft and is positioned in a transition area between the holding body and the shaft. The shaft has an annular collar with a flank which is inclined in a direction toward the first groove. The rotatable clamping ring encompasses the collar and engages the first annular groove. The rotatable clamping ring is seated on the shaft. The clamping ring has a second annular groove in which wedge-shaped sliding blocks are seated and are radially and axially moveable, but secured against canting within the second groove. The sliding blocks are supported on the inclined flank of the collar. A pressure screw is threadedly engaged within the clamping ring.

8 Claims, 1 Drawing Sheet ing specification, wherein:

TOOL HOLDING FIXTURE

BACKGROUND OF THE INVENTION

1. Field of the Invention

This invention relates to a device for setting the true running of a tool holder. Great importance is assigned to the true running of rotating tools. Precise true running results in a longer service life of the tools, particularly tools associated with milling, drilling and reaming, and accordingly results in fewer interruptions for changing the tools. Also, the tools need not be re-sharpened as often, so that the use of the tools is improved and costs are lowered. Deviations from true running lead to radially disruptive forces which not only damage the tools and cause increased wear, but also cause reduced dimensional accuracy of the work pieces to be processed. Accordingly, it is desirable to be able to set true running as accurately as possible.

2. Description of Prior Art

Up to now it has been attempted to produce holder bodies with highly accurate true running. Miscellaneous defects which are a function of the tool or which are created when clamping the tool have not been compensated.

Recently, holder bodies have been disclosed having a correction provided for compensating the deviation generated during clamping of the tool. This is accomplished with specially produced eccentric grinding of the conical holder body.

Also known are multi-part basic holders for setting true running following clamping of the tool. In addition to the relatively complicated adjustment of such multi-part basic holder bodies, stability is also effected in such structures.

SUMMARY OF THE INVENTION

It is therefore one object of this invention to provide a device in which true running of a one-piece tool holder can be set. In particular, it is intended that this setting take place at the machine itself, with the holder body installed and the tool in a clamped position.

This object is achieved with a device for setting the true running of a tool holder having a rotationally symmetrical holding body and a shaft forming one piece with an axially directed first annular groove that is concentric with the shaft and in a transition area between the holding body and the shaft. The shaft has an annular collar with a flank inclined in a direction toward the first groove. A rotatable clamping ring encompasses the collar and engages the first annular groove, and is seated on the shaft. The clamping ring has a second annular groove in which wedge-shaped sliding blocks are seated and are radially and axially moveable, but secured against canting within the second groove. The sliding blocks are supported on the inclined flank of the collar, and a pressure screw is threadedly engaged within the clamping ring.

If such setting is performed directly on the machine, all accumulated true running errors which result from the tool via the clamping cheeks and the receiver, including the steep angle tapered holder as far as the spindle bearing deviations, can be compensated. Particularly advantageous embodiments of this invention are set forth in the dependent claims and in the following specification.

BRIEF DESCRIPTION OF THE DRAWINGS

One preferred embodiment of this invention is shown in the drawings and explained in the following specification, wherein.

DESCRIPTION OF PREFERRED EMBODIMENTS

Figure 1:
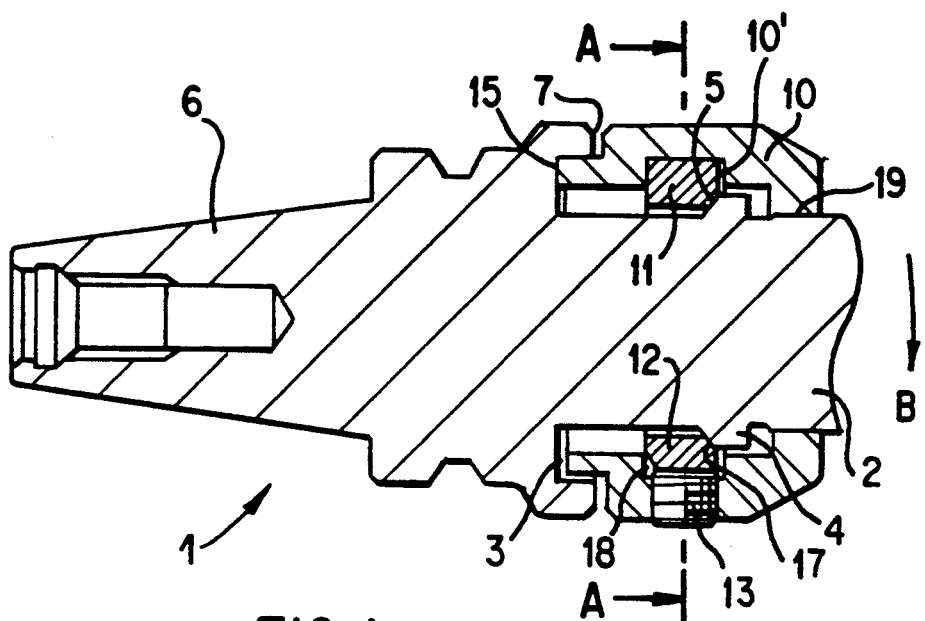
FIG. 1 is an axial, longitudinal sectional view of a tool holding fixture with a true running set device, according to one preferred embodiment of this invention.
Figure 2:
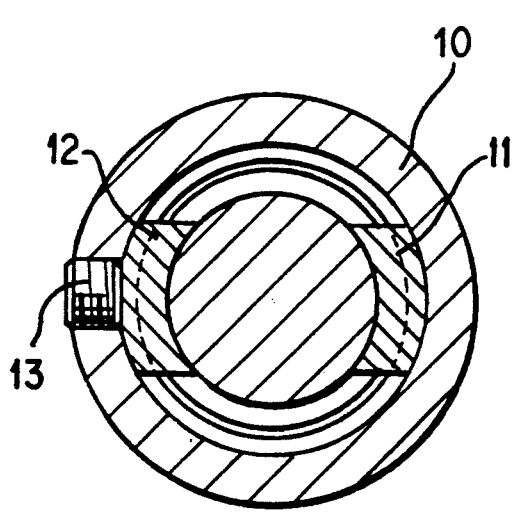
FIG. 2 is a cross section taken along line A—A of FIG. 1.
Figure 3:
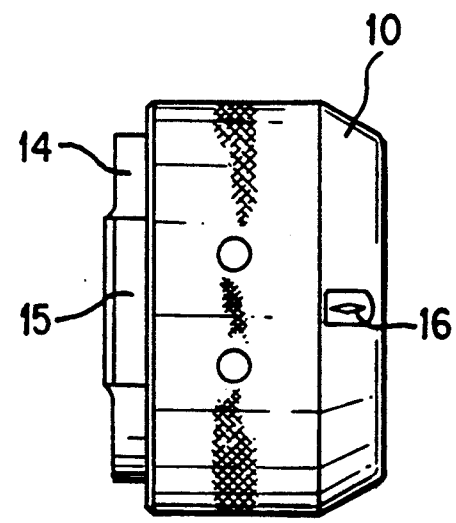
FIG. 3 is a side view of the clamping ring.

The tool holding fixture, essentially conventional in shape, comprises a rotationally symmetrical holding body 1 and a shaft 2 connected therewith. The holding body 1 and the shaft 2 form a one-piece unit, preferably machined from round bar steel. The holding body 1 is rotationally symmetrical and generally shown in the drawing as a steep angle tapered cone. It is apparent that any other rotationally symmetrical holder can be used in lieu of the steep angle tapered holder. For this reason, only a rotationally symmetrical holding body 1 will be mentioned below. The holding body 1 has an increased diameter in the area of its transition to the shaft 2. An axially directed annular groove 3 is cut into the shoulder. The groove 3 extending concentrically around the shaft 2 is shaped in such a way that its inner wall is formed by the shaft 2. The shaft 2 has an annular collar 4 spaced from the bottom of the groove 3 by approximately the radius of the shaft 2. The collar 4 is also formed in one piece with the shaft 2. The annular collar 4 has a flank 5 inclined in the direction of the groove 3. The inclination of the groove 3 is approximately 45° with respect to the longitudinal axis of the shaft 2.

The opposite flank of the collar 4 extends at least approximately radially outward from the shaft 2. The height of the collar 4 is less than the width of the circumferential annular groove 3.

A rotatable clamping ring 10 is mounted on the shaft 2. The through-bore 19 on the front of the clamping ring 10 is adapted in an exactly fitting manner to the shaft 2 of the tool holding fixture. The jacket wall of the clamping ring 10 is tapered at its back end to such a degree that the clamping ring 10 fits with a tolerance into the annular groove 3 of the holding body 1. A circumferential groove 10' with a square cross section is cut into the inside of the clamping ring 10, in which two sliding blocks 11 and 12 are seated and are located diametrically opposite each other. Although the sliding blocks 11 and 12 are seated movably in the radial and axial direction in respect to the shaft 2, they are secured against twisting in the groove 3. Both sliding blocks 11 and 12 have inclined edges 17 which are adapted to the inclination of the flank 5 of the collar 4. An axially, inwardly directed pressure screw 13 presses on the sliding block 12, on the bottom as shown in the drawing. The screw 13 is embodied, for example, as a stud screw with a hexagon socket. It is possible to apply pressure on the sliding block 12 with the screw 13 and thus a tensile force is exerted on the shaft 2 and pressure is conducted to the holding body I via the clamping ring 10. The clamping ring 10 has an appropriate raised surface 15 on its front face 14, so that the pressure force is transferred from the clamping ring 10 to the holding body 1 outside of the center and asymmetrically.

As a result a bending torque is exerted on the shaft 2 in the direction of the arrow B. Thus, the clamping ring 10 naturally performs a slight canting or tilting movement. The clamping ring 10 must be received with play or a tolerance in the groove 3 to assure tilting movement, as previously described. The tilting movement, which actually is more of a slight deformation of the clamping ring 10 and a slight bending of the shaft 2, also requires a small amount of freedom of movement of the sliding block 12 on which the pressure screw 13 acts. So that the sliding block 12 does not tilt in the groove 10' so that the clamping ring 10 is therefore jammed on the shaft 2, the sliding block 12 is partially slanted on its front face 18 which is oriented towards the groove 3.

The transmission ratio, which by means of many geometric factors of the construction, such as the diameter, is a function of the inclination of the slanted flank 5 of the collar 4 and of the inclined edge 17 on the sliding blocks 11 and 12.

With this invention, it is possible to perform the setting of true running either on the tool holding fixture alone or, as already previously described, with the tool clamped. This can take place either with a conventional pre-setting apparatus or with a stand and indicating caliper directly on the machine. For this purpose first the highest point is determined, after which the clamping ring 10 is turned so that a marking cut 16 applied to its exterior is aligned with this highest point. Now the pressure screw 13 is tightened to such an extent that the highest point is set back by half of the deflection of the indicating caliper. With this the setting is complete. Thus, the true running error can be reduced to an order of magnitude of 0.001 mm. Although, of course, different geometrical arrangements of the various structural elements by means of which the desired bending torque can be exerted on the shaft are possible. An economically preferred solution is the one shown in the drawings, having only two diagonally, oppositely located sliding blocks 11 and 12. For example, the desired bending element could also be formed by a part inserted in the annular groove 3, but this is a more complex solution. It is particularly advantageous to dispose the raised surface 15 on the clamping ring 10 on a side diametrically opposite the pressure screw 13. Thus, the lever is maximally embodied.

It may be advantageous to provide the annular groove 3 with an outwardly inclined lateral wall and to provide the rise, which is then supported by this lateral wall, with an equally inclined stop face. This may perhaps reduce the specific pressure and reduce the danger of a notching effect.

I claim:

1. A device for setting the true running of a tool holding fixture, comprising: a rotationally symmetrical holding body (1) and a shaft (2) forming one piece, said one piece having an axially directed first annular groove (3) concentric with the shaft (2) in a transition area between said holding body (1) and said shaft (2), said shaft (2) having an annular collar (4) with a flank (5) inclined in a direction toward said first groove (3), a rotatable clamping ring (10) encompassing said collar (4) and engaging said first annular groove (3) being seated on said shaft (2), said clamping ring (10) having a second annular groove (10') in which a plurality of wedge-shaped sliding blocks (11, 12) are seated and are radially and axially movable but secured against canting within said second groove (10'), said sliding blocks (11, 12) supported on said inclined flank (5) of said collar (4), and a pressure screw (13) threadedly engaged within said clamping ring (10).

2. A device in accordance with claim 1, wherein said clamping ring (10) has a raised surface (15) on a front face (14) of said clamping ring (10) which is positioned within said first annular groove (3).

3. A device in accordance with claim 2, wherein said raised surface (15) of said clamping ring (10) is positioned on a side located diametrically opposite said pressure screw (13).

4. A device in accordance with claim 2, wherein said clamping ring (10) has a marking cut (16) positioned on an outer periphery of said clamping ring (10) and said marking cut (16) is oriented towards a center of said raised surface (15).

5. A device in accordance with claim 1, wherein said sliding blocks (11, 12) have inclined edges (17) which have at least approximately a same degree of slant as said inclined flank (5) of said collar (4).

6. A device in accordance with claim 1, wherein one said sliding block (12) is positioned near said pressure screw (13) and has a front face (18) inclined towards said first annular groove (3).

7. A device in accordance with claim 1, wherein said holding body (1) has a tapered holder (6).

8. A device in accordance with claim 2, wherein said first annular groove (3) has an outwardly inclined wall having a rise that rests with a stop face of said clamping ring (10) which is approximately equally slanted.

* * * * *